United States Patent
Stone et al.

(10) Patent No.: US 9,672,134 B2
(45) Date of Patent: Jun. 6, 2017

(54) SCRIPTED MULTIPROCESS PROBING WITHOUT SYSTEM PRIVILEGE

(71) Applicant: Red Hat, Inc., Raleigh, NC (US)

(72) Inventors: Joshua Ian Stone, San Jose, CA (US); David Smith, Madison, AL (US); Frank Ch. Eigler, Ontario (CA)

(73) Assignee: Red Hat, Inc., Raleigh, NC (US)

( * ) Notice: Subject to any disclaimer, the term of this patent is extended or adjusted under 35 U.S.C. 154(b) by 157 days.

(21) Appl. No.: 14/052,439

(22) Filed: Oct. 11, 2013

(65) Prior Publication Data
US 2015/0106572 A1 Apr. 16, 2015

(51) Int. Cl.
G06F 9/54 (2006.01)
G06F 11/30 (2006.01)
G06F 11/36 (2006.01)

(52) U.S. Cl.
CPC ......... G06F 11/3644 (2013.01); G06F 9/544 (2013.01); G06F 11/3093 (2013.01)

(58) Field of Classification Search
CPC .. G06F 9/544; G06F 11/3089–11/3096; G06F 11/3644
See application file for complete search history.

(56) References Cited

U.S. PATENT DOCUMENTS

| | | | |
|---|---|---|---|
| 2002/0087949 A1* | 7/2002 | Golender et al. | 717/124 |
| 2002/0138788 A1* | 9/2002 | Yenne et al. | 714/38 |
| 2002/0152455 A1* | 10/2002 | Hundt et al. | 717/131 |
| 2004/0221120 A1* | 11/2004 | Abrashkevich | G06F 12/023 711/170 |
| 2007/0103175 A1* | 5/2007 | Eigler | 324/754 |
| 2007/0220495 A1* | 9/2007 | Chen et al. | 717/130 |
| 2007/0234016 A1* | 10/2007 | Davis | G06F 9/3802 712/227 |
| 2011/0271148 A1* | 11/2011 | Eigler et al. | 714/45 |
| 2011/0296387 A1* | 12/2011 | Cox et al. | 717/127 |

OTHER PUBLICATIONS

Josh Stone. "SystemTap Sans Kernel." Apr. 2012. https://events.linuxfoundation.org/images/stories/pdf/lfcs2012_jstone.pdf.*
Hennessy et al. Computer Architecture. 2007. Morgan Kaufmann. 4th ed. pp. C-38-C-42.*
Ollie Whitehouse. "An Analysis of Address Space Layout Randomization on Windows Vista™." 2007. http://www.symantec.com/avcenter/reference/Address_Space_Layout_Randomization.pdf.*
Xu et al. "Dynamic Instrumentation of Threaded Applications." Oct. 1998. ftp://ftp.cs.wisc.edu/paradyn/papers/Xu99Dynamic.pdf.*
Schulz et al. "DynTG: A tool for Interactive, Dynamic Instrumentation." Feb. 2005. https://e-reports-ext.llnl.gov/pdf/316760.pdf.*

(Continued)

*Primary Examiner* — Nathan Sadler
(74) *Attorney, Agent, or Firm* — Lowenstein Sandler LLP

(57) ABSTRACT

A controller process loads a module based on a user-generated script into itself. The controller process also generates a shared memory mapping using offset pointers as opposed to absolute pointers. The controller process loads the module and the shared memory mapping into target processes indicated by the user-generated script in order to probe the target processes.

16 Claims, 3 Drawing Sheets

(56) References Cited

OTHER PUBLICATIONS

Suresh Warrier. "ProbeVue: Extended Users Guide Specification." Jan. 2008. IBM. http://public.dhe.ibm.com/software/dw/aix/au-probevue.zip.*

Josh Stone. "Scripted Introspection with Dyninst." Mar. 2012. http://www.dyninst.org/sites/default/files/downloads/w2012/pdweek2012-jistone.pdf.*

Josh Stone. "Trying stapdyn (pure-userspace systemtap with dyninst)." Jul. 2012. http://sourceware.org/ml/systemtap/2012-q3/msg00090.html.*

Wilson et al. "Pointer Swizzling at Page Fault Time: Efficiently and Compatibly Supporting Huge Address Spaces on Standard Hardware." Sep. 1992. IEEE. IWOOOS '92.*

Buck et al. "An API for Runtime Code Patching." Nov. 2000. http://cipressosjsu.info/CS266/pdf/an_api_for_runtime_code_patching.pdf.*

Josh Stone. "sourceware.org Git—systemtap.git/blob—stapdyn/TODO." Aug. 2012. https://sourceware.org/git/gitweb.cgi?p=systemtap.git;a=blob;f=stapdyn/TODO;hb=923fc591b1dcf4de193079eb6c868359e2077d2d.*

Josh Stone, "Scripted Introspection with Dyninst", Red Hat, Mar. 26, 2012.

Josh Stone, David Smith, "stapdyn: Porting SystemTap onto Dyninst", Performance Tools @ Red Hat, Apr. 29, 2013.

Josh Stone, "WIP Support for Pure-Userspace Stap Through Dyninst", git://sourceware.org/systemtap.git/commitdiff, May 8, 2012.

Josh Stone, David Smith, "Systemtop and new connections: uprobes, dyninst, pcp", Red Hat, Aug. 30, 2012.

Red Hat Enterprise Linux Team, "Red Hat Announces Beta Availability of Red Hat Developer Toolset 2.0", Red Hat, May 30, 2013.

Josh Stone, "Bug 14706—Support multiple target processes in stapdyn", https://sourceware.org/bugzilla/show_bug.cgi?id=14706, Oct. 11, 2012.

* cited by examiner

SCRIPTED MULTIPROCESS PROBING WITHOUT SYSTEM PRIVILEGE

TECHNICAL FIELD

Embodiments of the present invention relate to process probing, and more specifically to process probing without system privilege.

BACKGROUND

An introspection tool allows users, such as system administrators and software developers, to examine the activities of software (e.g., operating system, applications, programs) while the software is executing to help diagnose a performance or functional problem. An introspection tool can include tracing and probing features, for example, to allow a user to examine variables in the software code, and to "hook" into the software code to gather information about the software.

A user can use an introspection tool to create a user introspection script containing functions to examine and monitor software. The script may probe processes for certain events and run custom probe handlers when those events occur. Probe handlers can print tracing output, update global script variables, and/or modify program state.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Figure 1:
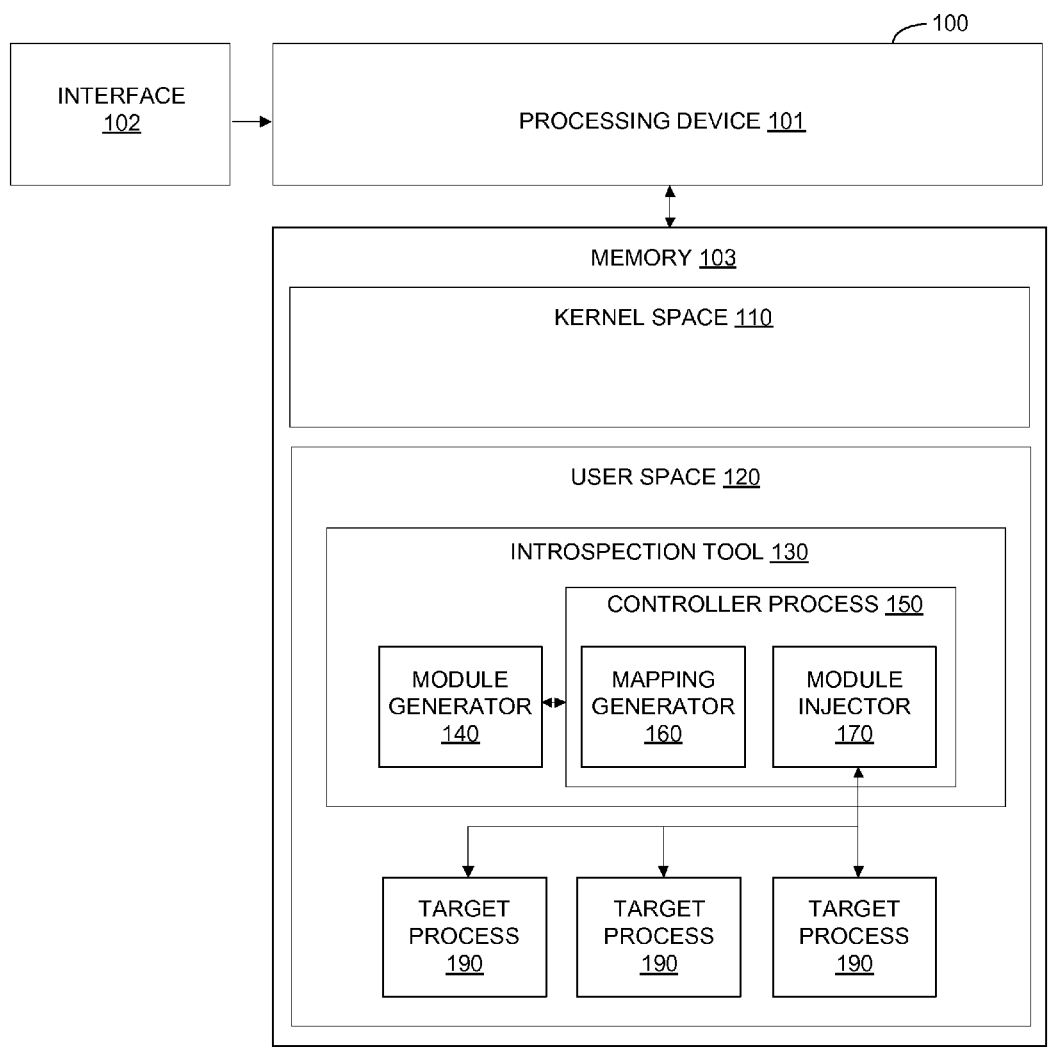
FIG. 1 is a block diagram that illustrates an embodiment of a computer system with a user space introspection tool.

Described herein is a method and system for providing process probing functionality to a user without system privileges. Some aspects of the present disclosure are directed to a runtime mode for an introspection tool that runs entirely in user space so system privilege is not required.

Traditionally, an introspection tool can translate and compile a user script to create binary code, a kernel module, that runs within kernel space. The introspection tool can then load and run the kernel module to examine software. Thus, user introspection scripts have typically provided full system-wide instrumentation to system administrators, including visibility and manipulation capabilities into a kernel or arbitrary user processes.

Unlimited full system-wide instrumentation, however, may be unsuitable for ordinary unprivileged users, such as software developers and performance analysis staff, as an unprivileged user may have access to probe processes of other users and access to probe the kernel itself. Limiting user access to a safe subset of functionality can be challenging, since an introspection tool typically involves the creation, loading, and execution of kernel modules, with complete theoretical control over the hardware. Thus, unprivileged users would either be granted more access than desirable or be denied access to the functionality of the introspection tool. Further, instrumentation using a kernel module usually requires switching into kernel-mode to execute, adding costly overhead.

Aspects of the present disclosure provide an introspection tool with a runtime mode that runs in user space. In the user space runtime mode, kernel modules are not generated or executed, so system privilege is not required. Further, the instrumentation can execute directly in each target process in user space, as described below, so the switching overhead is reduced or eliminated.

In some aspects, a user provides a script to an introspection tool. The user may select a user space runtime mode, or, if appropriately privileged, select a kernel space runtime mode. If the user is unprivileged, only the user space runtime mode may be available, and such a selection would be unnecessary.

In the user space runtime mode, a user space module can be generated based on the script (and predefined runtime functions) and the module can be loaded into a controller process running in user space. The controller process can load the module into target processes running in user space as specified by the script.

The controller process can also create a shared memory mapping large enough for all of the script's global variables as well as other runtime data the module may need. In one example, the shared memory mapping is fully address-neutral, with no absolute pointers. Rather, the data structures the module uses in shared memory, such as linked lists, associative arrays, etc., are implemented with offset pointers that indicate an offset from the pointer itself or from a base shared memory address of each process.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some embodiments are described herein with reference to an introspection tool. However, it should be appreciated that the principles introduced and described with reference to introspection tools also apply to other forms of process management and shared memory mapping. Accordingly, embodiments of the present invention are not limited to introspection tools, and those embodiments describing introspection tools may be modified for other purposes.

FIG. 1 is a block diagram that illustrates an embodiment of a computer system 100 that includes a user space introspection tool 130. The computer system 100 may be a rackmount server, a workstation, a desktop computer, a notebook computer, a tablet computer, a mobile phone, a palm-sized computing device, a personal digital assistant (PDA), etc.

The computer system 100 includes a processing device 101 coupled to an interface 102 and a memory 103. The interface 102 may be used to receive a script from a user or to provide output to a user. The interface 102 may comprise a wireless or wired connection to a network or may comprise physical interface devices, such as a keyboard or monitor.

The processing device 101, which may include one or more processing units, defines a kernel space 110 and a user space 120 in the memory 103. The kernel space 110 and user space 120 may be part of system memory created by an operating system executed by the processing device 101. Privileged kernels and kernel extensions, such as operating system kernels, may run in the kernel space 110. A user may need system privileges to execute processes in the kernel space 110. In contrast, an unprivileged user can execute processes in the user space 120.

An introspection tool 130 may be executed in the user space 120. In turn, the introspection tool 130 may include a number of components executed in the user space 120, such as a module generator 140 and a controller processor 150. The module generator 140 receives a script from a user (e.g., via the interface 102), and generates a module based on the script. Some aspects of generating a module based on a script will be discussed in more detail below.

The controller process 150 is responsible for high-level control of the target processes 190. Target processes 190 refer to the processes executing on the computer system 100, which the script is written to probe. The controller process 150 loads the module (generated by the module generator 140) into itself. Further, the controller process 150 injects the module into one or more target processes 190 specified by the script with a module injector 170.

The controller process 150 also creates a shared memory mapping with a mapping generator 160. The shared memory mapping may be devoid of absolute pointers. Rather, data structures are implemented with offset pointers. That is, memory addresses that would normally store an absolute pointer (a pointer that explicitly recites an absolute address, also referred to as a specific address, that designates a memory address without additional information) are configured to store an offset pointer (a pointer that recites a relative address that designates a memory address in reference to another location, e.g., the offset pointer itself or a base address). The base address may be different for each target process 190 and be generated by the mapping generator 160 and fed into each target process by the module injector 170, as will be discussed in more detail below.

The script may include instructions to print some output to the user. This output may be distinct from the output that the target processes 190 would generate without the script being introduced. An output channel may be defined by the shared memory mapping as a region of the memory to be used to output this information to the user.

Figure 2:
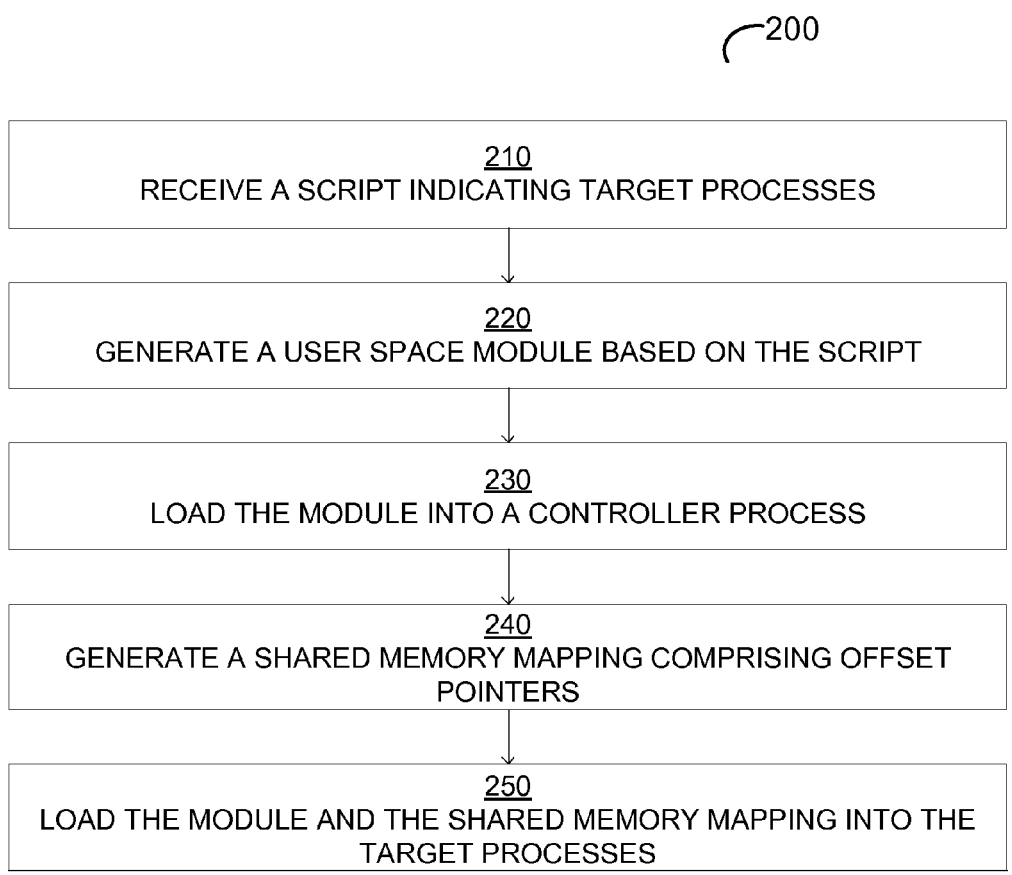
FIG. 2 is a flow diagram illustrating one embodiment for a method of running a user space introspection tool.

FIG. 2 is a flow diagram illustrating one embodiment for a method 200 of running a user space introspection tool. Method 200 may be performed by processing logic that may include hardware (e.g., circuitry, dedicated logic, programmable logic, micro-code, etc.), software (e.g., instructions executed by a processing device), or a combination thereof. For example, method 200 may be performed by introspection tool 130.

At block 210 of method 200, introspection tool 130 receives a script indicating one or more probe points in one or more target processes. Each probe point may be a location in the code of the target process at which the user desires to receive information regarding the status of the target process, a different target process, or another portion of the system. The script may be written in a domain-specific language. For example, the Linux® operating system may use the SystemTap introspection tool, and the script may be written in SystemTap's domain-specific language. The script may indicate an action to be taken at one of the one or more probe points. The action to be taken may be, for example, to print an output visible to the user, update a variable defined by the script, or modify a program state. The action to be taken may be to output information via an output channel defined by the shared memory mapping.

At block 220, the introspection tool 130 generates a user space module based on the script. In one example, the received script is parsed along with a system-installed library of predefined functions and probe points collectively referred to as "tapsets." The script's probes and variable references are analyzed. This may be performed by reading debugging information about installed packages, which may be presented in a DWARF (Debugging with Attributed Record Formats) data format.

The introspection tool 130 may generate a representation of the script and tapsets as a C-language source file that is compiled to create the user space module as a dynamic share object (DSO). Thus, generating the module may comprise parsing the script, generating a source file based on the script and a library of functions, and compiling the source file and the library of functions to generate the module.

At block 230, a controller process in user space loads the module into itself by copying the module into a memory space associated with the controller process. The controller process can be a helper executable that compliments the mostly self-contained DSO module. The controller process may be responsible for high-level control of the target processes. The controller process analyzes the module to determine the specified probe points and target processes. For example, the controller process may query the module using well-defined function calls similar to DSO-plugin designs.

At block 240, the controller process generates a shared memory mapping comprising one or more offset pointers that define memory locations using offsets from a predefined location, which can be either the memory location of the offset pointer itself or a defined base memory location. Shared memory is an important aspect of an introspection tool. For example, a script may use global variables to track state. The script may indicate, at one probe point, that a global variable should be set to a value representing a current context of an executing target process. At another probe point, even in a different target process, this global variable may be read to conditionally decide what action to take. This could be used to track complex interprocess transactions for debugging or other purposes.

In a kernel space runtime mode, the kernel memory can be used as a shared memory. However, in a user space runtime mode, the controller process generates a shared memory mapping. The shared memory mapping is a memory mapping that defines a shared memory to be used by more than one of the target processes and/or the controller process. The mapping associates logical memory addresses in each of the target processes and the controller process with physical and/or virtual memory addresses. The generated shared memory mapping may define a shared memory large enough to store all of the script's global variables as well as other runtime data the module may need.

Using absolute pointers to particular memory locations in the shared memory mapping may be problematic because one of the target processes may already have something mapped to one of the particular memory locations. This problem may be mitigated by analysis of the target processes by the controller process. However, this may be an incomplete solution, as a child process of the target process may have a fixed mapping to one of the particular memory locations.

In one aspect, the shared memory is mapped to locations that happen to be free in each process, which may not be the same for each process. Thus, the contents of the shared memory may be address-neutral, with no absolute pointers. Rather, data structures used by the module in shared memory, such as linked lists, associative arrays, and the like, may be implemented with offset pointers that indicate an offset from the memory location in which the offset pointer is located or from a base shared-memory address specified to each target process by the controller process. In particular, the base shared-memory address may be different for different target processes.

At block 250, the controller process loads the module and the shared memory mapping into the one or more target processes. The shared memory mapping loaded into a particular target process may include the base shared-memory address specific to the particular target process. The controller process may either initiate execution of a target process and load the module and shared memory mapping into the target process or dynamically load the module and shared memory mapping into a running target process. In one aspect, the controller process dynamically tracks the state of the system at the one or more probe points, each with a function call to the injected module's probe handler with arguments representing the captured register state.

In one aspect, if one of the target processes creates a new process, the controller process will track the new process. For a "fork" function call, which divides a process into two identical processes, the new process will inherit the module, but for an "exec" function call, which runs a new process, the controller module will inject the module into the new process.

Thus, the controller process essentially rewrites executable section of the processes to insert new machine instructions as specified by the script.

In some aspects, the script will cause one of the target processes to output information to the user. This information could include statements of individual events or broad summaries of recent metrics. For example, the script could monitor the state of a variable and output its value each time it is changed. As another example, the script could record how much time a process spends executing a particular subroutine. Other debugging information could be obtained using well-defined scripts. As this output information may be distinct from the target program's normal behavior, a standard output channel may be defined in the shared memory for outputting the information. In one aspect, the shared memory includes a fixed allocation of circular buffers, proportional to the number of CPUs (central processing units), to allow concurrent writes. The circular buffers may be synchronized with pthread mutexes and conditional variables. A pthread mutex is a data type defined for POSIX threads with two basic operations, lock and unlock. If a mutex (mutual exclusion) is unlocked and a thread calls lock, the mutex locks and the thread continues. If, however the mutex is locked, the thread is stopped until the thread that locked the mutex calls unlock. Thus, there is minimal or no data copying and predefined synchronization primitives, simple software mechanisms provided by a platform, such as an operating system, may be used to awaken it.

As described above, in some aspects of the disclosure, the target processes are fed or injected with a shared memory mapping and instructions to change the contents of the shared memory when certain events occur. Thus, the target processes themselves change the contents of the memory rather than the controller process. This differs from embodiments in which the target processes return information back to the controller process when certain events occur which may cause the controller process to change the memory contents.

By having the target processes change the contents of the memory, performance may be improved, because the operating system need not context-switch back to the controller process and the number of system calls can be reduced. In one aspect, the controller process may enforce mutexes (mutual exclusions) protecting concurrent access to some of the shared-memory states.

In one aspect, the computer system 100 of FIG. 1 comprises a mixed architecture. For example, the computer system 100 may comprise an x86_64 system running one or more 32-bit x86 programs. In such embodiments, the controller process will match the native system architecture and the script is compiled into both a primary module matching the native architecture and a secondary module matching the compact architecture. The controller process determines whether to inject the primary module or the secondary module based on the target process the module is being injected into.

Further, the controller process may generate the shared memory mapping such that each structure in the shared memory is independent of the size of machine words. For example, the shared memory may be composed of length-specific data types (e.g., int32_t or uint64_t) and exclude unspecific data types (e.g., short or long).

Figure 3:
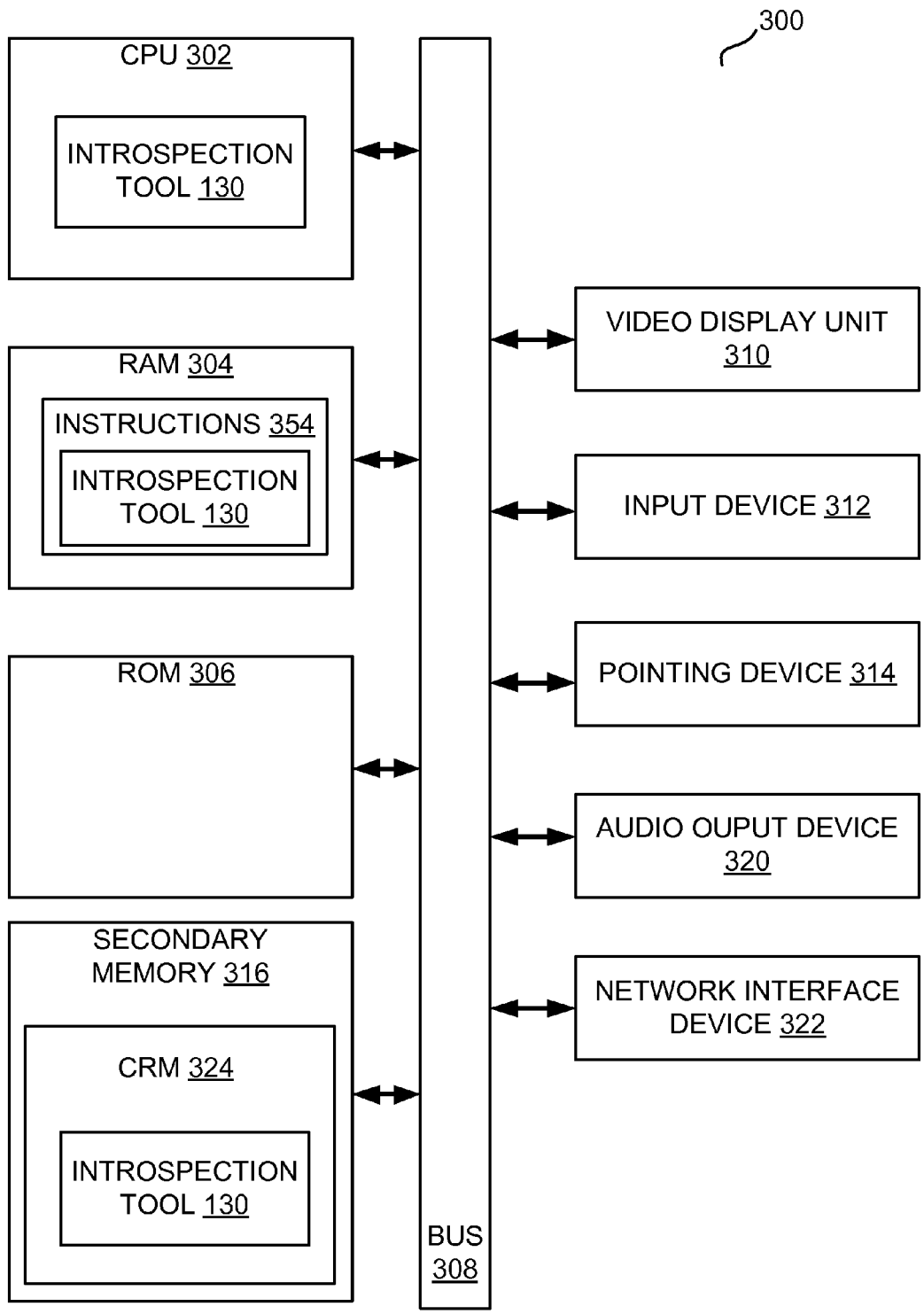
FIG. 3 illustrates a diagrammatic representation of a machine in the exemplary form of a computer system.

FIG. 3 illustrates a diagrammatic representation of a machine in the exemplary form of a computer system 300 within which a set of instructions, for causing the machine to perform any one or more of the methodologies discussed herein, may be executed. The computer system 300 may correspond to computer system 100 of FIG. 1. In embodiments of the present invention, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 300 includes a processing device 302, a main memory 304 (e.g., read-only memory (ROM), flash memory, dynamic random access memory (DRAM) such as synchronous DRAM (SDRAM) or Rambus DRAM (RDRAM), etc.), a static memory 306 (e.g., flash memory, static random access memory (SRAM), etc.), and a secondary memory 316 (e.g., a data storage device), which communicate with each other via a bus 308.

The processing device 302 represents one or more general-purpose processors such as a microprocessor, central processing unit, or the like. The term "processing device" is used herein to refer to any combination of one or more integrated circuits and/or packages that include one or more processors (e.g., one or more processor cores). Therefore, the term processing device encompasses a single core CPU, a multi-core CPU and a massively multi-core system that includes many interconnected integrated circuits, each of which may include multiple processor cores. The processing device 302 may therefore include multiple processors. The processing device 302 may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 302 may also be one or more special-purpose processing devices such as an application specific integrated circuit (ASIC), a field programmable gate array (FPGA), a digital signal processor (DSP), network processor, or the like.

The computer system 300 may further include a network interface device 322. The computer system 300 also may include a video display unit 310 (e.g., a liquid crystal display (LCD) or a cathode ray tube (CRT)), an alphanumeric input device 312 (e.g., a keyboard), a cursor control device 314 (e.g., a mouse), and a signal generation device 320 (e.g., a speaker).

The secondary memory 316 may include a machine-readable storage medium (or more specifically a computer-readable storage medium) 324 on which is stored one or more sets of instructions 354 embodying any one or more of the methodologies or functions described herein (e.g., introspection tool 130). The instructions 354 may also reside, completely or at least partially, within the main memory 304 and/or within the processing device 302 during execution thereof by the computer system 300; the main memory 304 and the processing device 302 also constituting machine-readable storage media.

While the computer-readable storage medium 324 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium other than a carrier wave that is capable of storing or encoding a set of instructions for execution by the machine that cause the machine to perform any one or more of the methodologies of the present invention. The term "computer-readable storage medium" shall accordingly be taken to include, but not be limited to, non-transitory media such as solid-state memories, and optical and magnetic media.

The modules, components and other features described herein (for example in relation to FIG. 1) can be implemented as discrete hardware components or integrated in the functionality of hardware components such as ASICS, FPGAs, DSPs or similar devices. In addition, the modules can be implemented as firmware or functional circuitry within hardware devices. Further, the modules can be implemented in any combination of hardware devices and software components, or only in software.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "adding", "receiving", "determining", "routing", "performing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description above. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
   receiving a script indicating a probe point in a target process of a plurality of target processes, wherein the script indicates an action to be taken at the probe point in probing the plurality of target processes; and
   executing, by a processor, a controller process in user space in view of the script, wherein the executing comprises:
   generating, by the processor, a shared memory mapping comprising an offset pointer defining a shared memory space to be shared between the controller process and the target process;

loading, by the processor, the shared memory mapping into the plurality of target processes, wherein each of the plurality of target processes is associated with a different address of a corresponding offset pointer with respect to the shared memory space, and wherein loading the shared memory mapping into the target process results in the action being taken upon execution of the target process comprising the probe point; and updating, by the processor, a variable stored in the shared memory space in view of the probe point, wherein the updating of the variable modifies a state of the target process.

2. The method of claim 1, wherein the action comprises outputting information via an output channel.

3. The method of claim 1, further comprising:
parsing the script;
generating a source file in view of the script and a library of functions; and
compiling the source file and the library of functions.

4. The method of claim 1, wherein the target process is in user space.

5. The method of claim 1, wherein the shared memory mapping is address neutral and does not comprise an absolute pointer.

6. The method of claim 1, wherein loading the shared memory mapping into the target process comprises loading the shared memory into a new process generated by the target process.

7. The method of claim 1, wherein the updating of the variable indicates whether a conditional action is to be executed by the target process.

8. The method of claim 1, further comprising, responsive to detecting that a new process is generated by the target process, tracking, by the processor, a state of the new process by injecting an instruction into the new process in accordance with the script.

9. A non-transitory computer readable storage medium having instructions that, when executed by a processing device, cause the processing device to:
receive, by the processing device, a script indicating a probe point in a target process of a plurality target processes, wherein the script indicates an action to be taken at the probe point in probing the plurality of target processes;
execute, by the processing device, a controller process in user space in view of the script to:
generate a shared memory mapping comprising an offset pointer defining a shared memory space to be shared between the controller process and the target process;
load the shared memory mapping into the plurality of target processes, wherein each of the plurality of target processes is associated with a different address of a corresponding offset pointer with respect to the shared memory space, and wherein to load the shared memory mapping into the target process results in the action being taken upon execution of the target process comprising the probe point; and
update a variable stored in the shared memory space in view of the probe point, wherein the update of the variable modifies a state of the target process.

10. The non-transitory computer readable storage medium of claim 9, wherein the executable instructions further cause the processing device to:
parse the script;
generate a source file in view of the script and a library of functions; and
compile the source file and the library of functions.

11. The non-transitory computer readable storage medium of claim 9, wherein the target process is in user space.

12. The non-transitory computer readable storage medium of claim 9, wherein the shared memory mapping is address neutral and does not comprise an absolute pointer.

13. The non-transitory computer readable storage medium of claim 9, wherein the executable instructions further cause the processing device to, responsive to detecting that a new process is generated by the target process, track a state of the new process by injecting an instruction into the new process in accordance with the script.

14. A computing device comprising:
an interface to receive a script indicating a probe point in a target process of a plurality of target processes, wherein the script indicates an action to be taken at the probe point in probing the plurality of target processes; and
a processing device, operatively coupled to the interface, to:
generate a shared memory mapping comprising an offset pointer defining a shared memory space to be shared between the controller process and the target process;
load the shared memory mapping into the plurality of target processes, wherein each of the plurality of target processes is associated with a different address of a corresponding offset pointer with respect to the shared memory space, and wherein to load the shared memory mapping into the target process results in the action being taken upon execution of the target process comprising the probe point; and
update a variable stored in the shared memory space in view of the probe point, wherein the update of the variable modifies a state of the target process.

15. The computing device of claim 14, wherein the shared memory mapping is address neutral and does not comprise an absolute pointer.

16. The computing device of claim 14, wherein the processing device is further to, responsive to detecting that a new process is generated by the target process, track a state of the new process by injecting an instruction into the new process in accordance with the script.

* * * * *